United States Patent [19]

Covey et al.

[11] Patent Number: 4,601,581
[45] Date of Patent: Jul. 22, 1986

[54] METHOD AND APPARATUS OF DETERMINING THE TRUE EDGE LENGTH OF A BODY

[75] Inventors: Robert L. Covey, Cranbury, N.J.; Michael T. Gale, Wettswil, Switzerland; Istvan Gorog, Princeton; John P. Beltz, Willingboro, both of N.J.

[73] Assignee: RCA Corporation, Princeton, N.J.

[21] Appl. No.: 719,730

[22] Filed: Apr. 4, 1985

[51] Int. Cl.[4] ............................................. G01B 11/14
[52] U.S. Cl. ...................................... 356/383; 356/375
[58] Field of Search ......................... 356/383, 372, 384

[56] References Cited

U.S. PATENT DOCUMENTS 4,296,371 10/1981 Keizer et al. ...................... 324/61 R
4,341,472 7/1982 Gorog et al. ......................... 356/399
4,523,850 6/1985 Covey et al. ......................... 356/375

OTHER PUBLICATIONS

M. T. Gale et al. Entitled "Image Sampling and Analysis Technique for High-Resolution Measurement of Micrometer-Sized Features", Intern'l Conf. on Optoelectronics in Telecommunication and Measurement Systems, Oct. 12, 1982.
M. T. Gale et al. Entitled "Image Sampling and Analysis Technique for High-Resolution Measurement of Micrometer-Sized Features," RCA Engineer, 29-2 Mar./Apr. 1984.

Primary Examiner—R. A. Rosenberger
Assistant Examiner—Crystal D. Cooper
Attorney, Agent, or Firm—Birgit E. Morris; Donald S. Cohen

[57] ABSTRACT

A method and apparatus for determining the true edge length of a body subtended by two other body edges comprises exposing the body to a beam of light such that the edge is imaged by an optical system for projecting a linear section across the body as a silhouette-like image onto a linear array of photosensitive detectors. The image is usually blurred due to diffraction effects. The body is initially positioned in focus and then scanned moving the array provide an image of at least a portion of the desired edge to define a reference line representing the location of the edge. The array is then moved in scanned sequence from that reference line to provide fifty percent (50%) intensity level data points to define the other body edges. Lines are fitted through such data points and extended to intersect the reference line to determine the true length of the edge even with a blurred image of portions of that edge.

19 Claims, 9 Drawing Figures

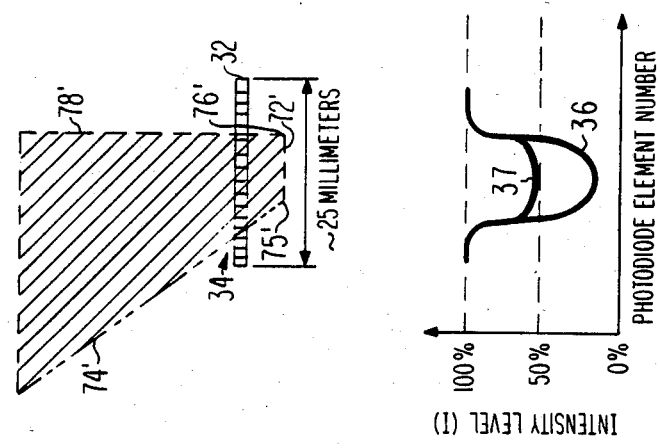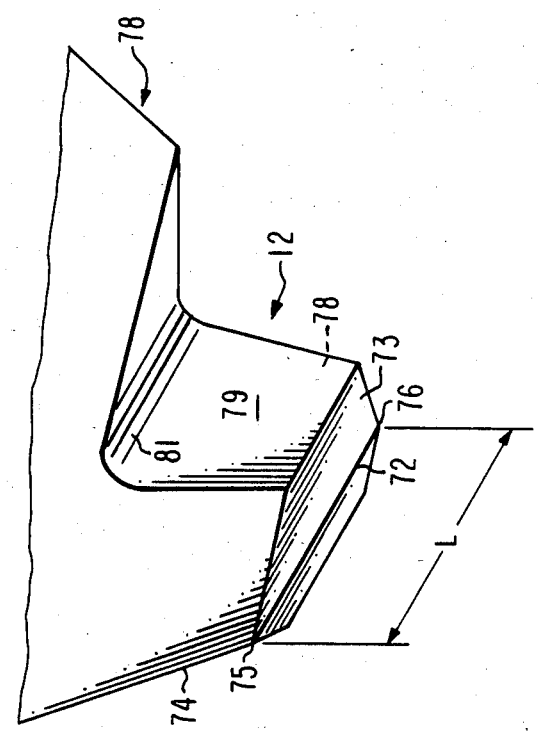

METHOD AND APPARATUS OF DETERMINING THE TRUE EDGE LENGTH OF A BODY

This invention relates to a method of determining, using an optical apparatus, the true edge length of a body even with a blurred image.

BACKGROUND OF THE INVENTION

In the manufacture of very small bodies, there is a need to determine the dimensions of one or more of the body edges. For example, a stylus used to derive stored information from video or audio discs is typically made from a natural or synthetic diamond by several critical shaping and lapping process steps sometimes referred to as "micromachining." The stylus tip is tapered to form the prow of the tip and is also lapped to form a keel having a V-shaped shoe for its bottom portion. Such a keel-shaped tip has a shoe length of about 3 to 5 micrometers ($\mu$m) and a width of about 2 $\mu$m.

An optical method and apparatus for positioning a tapered body viewed from the two sides is described in U.S. Pat. No. 4,341,472 issued to I. Gorog, M. A. Leedom and J. P. Wittke on July 27, 1982, entitled "Method And Apparatus For Positioning A Tapered Body."

A system for positioning a body which uses a single photodetector array and requires free access only in one direction is described in a commonly-owned U.S. patent application of R. L. Covey and M. T. Gale entitled "System For Positioning A Body," Ser. No. 434,316, filed Oct. 14, 1982. This system enables a body, such as the tip of a stylus, to be accurately and automatically positioned within a small volume of space.

The present invention is an improvement of a system, such as that of the above-described copending application, by determining the true edge length of a body, such as the shoe length of the tip of a stylus, using optical apparatus that may cause a blurred image of the edge due to diffraction effects.

In general, there is a need to provide an accurate measurement or determination of edges of very small bodies using optical apparatus particularly when the image of the body and the edges to be evaluated are blurred.

SUMMARY OF THE INVENTION

A method and apparatus for determining the true edge length of a body subtended by two other body edges comprises exposing the body to a beam of light such that the edge is imaged by an optical system for projecting a linear section across the body as a silhouette-like image onto a linear array of photosensitive detectors. Portions of the image are usually blurred due to diffraction effects. The body is initially positioned in focus and then scanned to provide an image of at least a portion of the desired edge to define a reference line representing the location of the edge. The array is then moved in scanned sequence from that reference line to provide predetermined intensity level data points to define the other body edges. Lines are fitted through such data points and extended to intersect the reference line to determine the true length of the edge even with a blurred image of portions of that edge.

BRIEF DESCRIPTION OF THE DRAWING

FIG. 3 is a fragmentary detail showing the basic line geometry of a stylus tip;

FIG. 4 is a cross-sectional view taken along viewing line 4—4 of FIG. 1;

FIG. 5 is a diagram of the light intensity profile correlated along the photodetector array shown in FIG. 4;

DETAILED DESCRIPTION OF THE PREFERRED EMBODIMENT

Figure 1:
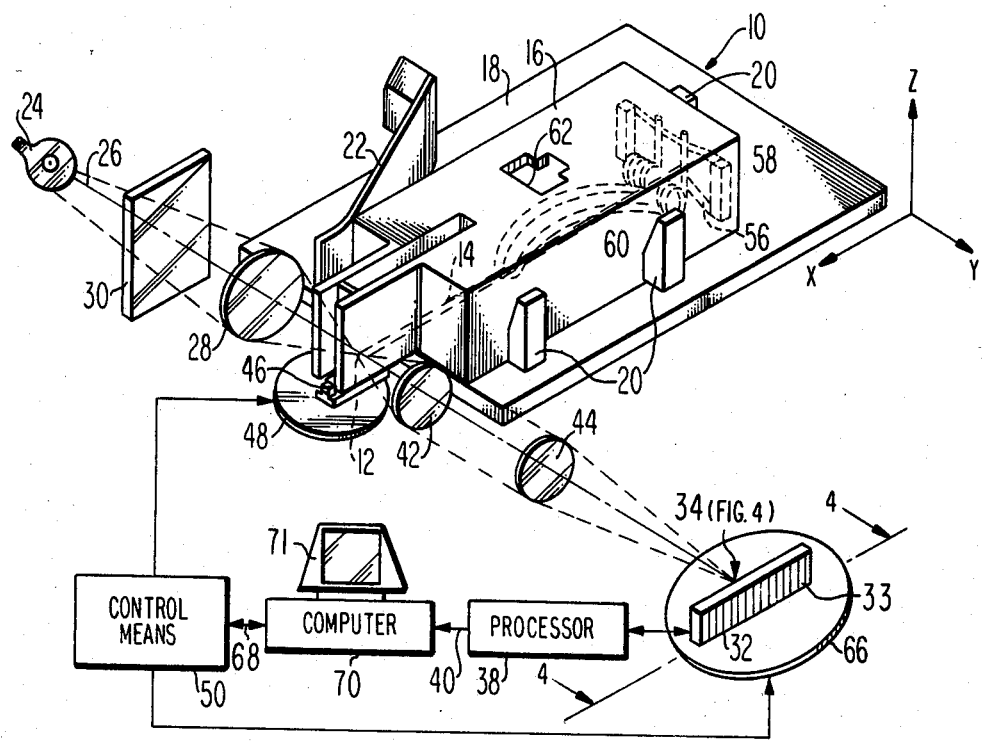
FIG. 1 is a perspective diagrammatic view illustrating the apparatus of an optical system for positioning a body, such as a stylus, according to the present invention.
Figure 2:
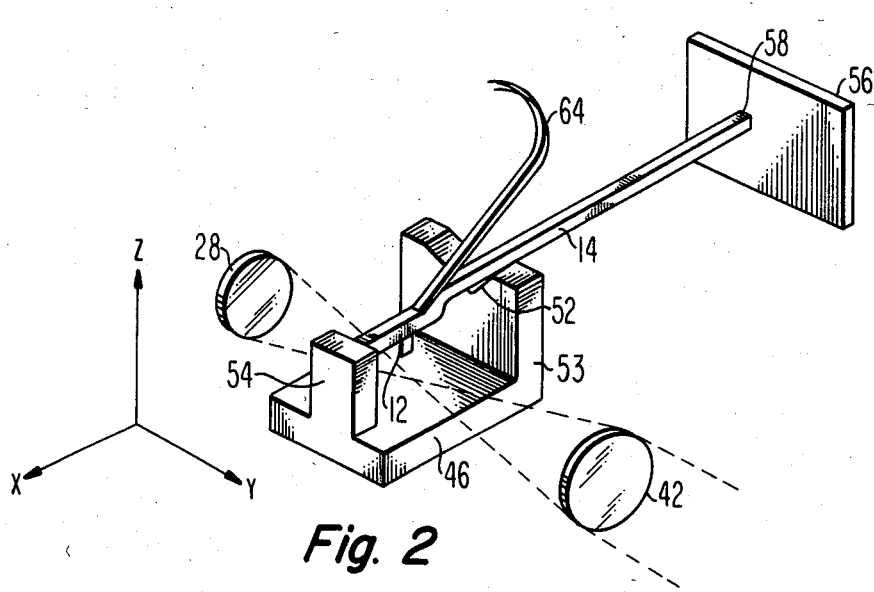
FIG. 2 is an enlarged perspective view of a portion of FIG. 1 illustrating the apparatus at the location of the stylus.

In FIG. 1, there is shown one embodiment of an apparatus 10 for positioning an opaque body which may comprise, for example, a tip 12 of a stylus mounted at the end of an arm 14, also shown in greater detail in FIG. 2. While the present invention is described for determining the shoe length of a video disc stylus, the invention can be used for other applications. For example, the invention can be used for determining the length of a tip of a diamond during coning operations. In general, it can be used preferably to determine the length of an edge of any body with small thickness and straight edges.

Moreover, the invention provides a general method for obtaining high-resolution information from an optical system wherein the value of the numerical aperture (NA) of the system is low, for example, on the order of 0.45, wherein the Rayleigh resolution is about 0.8 $\mu$m, as will be described more fully hereinafter.

Apparatus useful in the practice of the present invention is described in the above-mentioned copending U.S. patent application, Ser. No. 434,316 of R. L. Covey and M. T. Gale, two of the present co-inventors. A description of the method and apparatus for determining the shoe length of video disc stylus tips is described in the Proceedings of the International Conference of Opto-Electronics in Tele-Communications and Measurement Systems, by a paper dated Oct. 12, 1982, entitled "Image Sampling And Analysis Technique For High Resolution Measurement Of Micrometer-Sized Features." A similar paper was published in the RCA Engineer, Mar/Apr 29-2, 1984. The present invention, as will be described, provides an improvement in the method described in the aforementioned papers by determining the true length of an edge of a body to a very high degree of accuracy, on the order of 0.1 $\mu$m, even with a blurred image of the edge caused by diffraction effects.

In the present embodiment, the apparatus 10 includes components described in the above-mentioned patent application Ser. No. 434,316. The arm 14 is flexibly attached to a video disc player cartridge 16 which is seated on a stationary base plate 18 between three locating pins 20 and a leaf spring 22. The stylus tip 12 has a first axis oriented along an edge 72 of the tip 12, as seen in fragmentary form in FIG. 3. In the present embodiment, the first axis is located along the shoe length (L) of the stylus tip 12 and is oriented along the x direction, as shown in the axes diagrams of FIGS. 1 and 2. The stylus tip 12 (FIG. 3) typically includes a prow 74 terminating at a base 75 thereof and a stem 76 of an electrode face 78 remote from the prow 74. A keel 79 extends from the shoe plane 73 to a shoulder 81.

The tip 12 is adapted to track a path along a surface of an information record and to measure capacitive variations between the stylus tip 12 and the surface of the record when relative motion is established between the stylus tip 12 and the record, as shown, for example, in U.S. Pat. No. 4,296,371. The shoe length (L) of the stylus tip 12 comprises the distance between the base 75 and the stem 76 along a line tangent to the path at the tracking location.

The apparatus 10 comprises a light source 24 positioned to expose the stylus tip 12 to a beam 26 of light oriented along a second axis y substantially orthogonal to the first axis (x direction) in a direction such that the silhouette of the edge 72 is imaged by an optical system. In the present embodiment, the light source 24 comprises a 100 watt quartz-halogen incandescent lamp. A fiber-optic light guide (not shown) may be used if it is desirable to remove the housing of the light source 24 from the vicinity of the stylus tip 12 for space considerations. Preferably, a condenser lens 28 is disposed between the light source 24 and the stylus tip 12 for forming a uniform high-density light spot in the region of the tip 12. In the present embodiment, the condenser lens 28 is a 10×0.25 NA (numerical aperture) microscope objective. In addition, a heat filter 30, with a cut-off at $\lambda = 0.75$ $\mu m$, may be placed between the light source 24 and the condenser lens 28 for minimizng heating and thermal expansion effects of the stylus tip 12 by removing the unwanted infrared wavelengths and to improve optical resolution.

The apparatus 10 further comprises a linear array 32 of photosensitive elements, such as photodetectors 33, disposed along a direction substantially parallel to the first axis (x direction) in a position such that a linear section across the stylus tip 12 is projected by the optical system as a silhouette-like image 34 (FIG. 4) onto the array 32. The profile 36 shown in FIG. 5 represents an intensity level (I) that is generated by the respectively scanned photodiode elements of the array 32 when aligned above the imaged edge 72'. Profile 37 is generated when the edge 72' is near or at the fifty percent (50%) intensity level. As explained more fully in the above-identified U.S. patent application Ser. No. 434,316, the intensity level at each photodetector 33 and the profile 36 from a plurality of such levels is dependent on the relative position of the body and the array 32.

The apparatus 10 also includes means for scanning the array 32 to obtain a light intensity profile 36 (FIG. 4) of the projected image 34 along the array 32. The scanning means may be part of a processor 38 connected to the array 32 which generates a first information and control signal 40 corresponding to a light intensity profile, such as profile 36. Preferably, the array 32 is sampled by an analog-to-digital (A/D) converter to provide optical information signals to the computer 70.

A suitable computer 70 is an Intel single board computer No. 88/25. An Intel type 8088 microprocessor may be used for the processor 38. Processor 38 is further supplemented with the Reticon type interface and A/D converter to sense and process the gray scale optical signals from the array 32 available from EG&G Reticon, Sunnyvale, Calif.

In the present embodiment, the array 32 comprises a scanning photodiode array containing up to 1,728 individual elements or photodiodes (33), each 16 $\mu m$ high and spaced 15 $\mu m$ apart, and which are electronically scanned and sampled with a repetition period of about 30 milliseconds. The array 32 is about 25 millimeters long. Such an array 32 is available as an integrated circuit-type package with a ground and polished quartz window, commercially available as RL1728H also from EG&G Reticon, Sunnyvale, Calif. Charge coupled device (CCD) imagers may also be used for the photosensitive elements.

The optical system of the present apparatus 10 includes a long-working distance (LWD) microscope objective lens 42 and an eyepiece lens 44 disposed between the stylus tip 12 and the array 32 for magnifying and focusing the image 34 of the tip 12 onto the array 32. The LWD objective lens 42 must have a working distance sufficiently large enough to clear to the side of the cartridge 16, which is approximately 5 millimeters from the stylus tip 12, to allow free movement of the stylus. The LWD lens 42 should have a numerical aperture (NA) in the range of 0.45 to 0.5 and a power from 20× to 50×. In the present example, a Bausch & Lomb 50× 0.45 NA objective has been found to give good results and is very convenient because of its extraordinarily long working distance of 12.5 millimeters. A 5× or 10× eyepiece lens 44 is used to project an image 34 of the side of the stylus tip 12 onto the photodetector array 32. The combination of the LWD objective lens 42 and the 10× eyepiece lens 44 gives a non-inverted image 34 with a magnification of about 200× in the plane of the array 32. Thus, an individual Reticon element corresponds to an approximate square about 750 Angstroms on a side in the plane of the stylus tip 12.

The apparatus 10 further comprises suitable means for shifting the stylus tip 12 along the first axis (x direction), means for moving the tip 12 along the second axis (y direction), and means for shifting the tip 12 along a third axis, substantially orthogonal to the first axis (x direction) and the second axis (y direction). The third axis is oriented along the z direction. In the present embodiment, the apparatus 10 also includes a fixture 46 supported on a first translational stage 48 adapted for positioning the arm 14. The means for shifting and moving the stylus tip 12 comprise a three-axes translation control means 50 for driving the first translation stage 48 in directions oriented along the first (x direction), second (y direction) and third (z direction) axes. The first translational stage 48 is driven by three stepping motors positioned along orthogonal axes each of which step in 1 $\mu m$ intervals and, preferably, have a maximum step rate of 1000 steps/second. The stepping motors are conventional and available from Ardel Kinematic, College Point, N.Y.

The fixture 46 has a V-shaped groove 52 positioned to guide the arm 14 in directions oriented along the second (y direction) and third (z direction) axes, as shown in FIG. 2. The V-shaped groove 52 is disposed upright in a vertical wall 53 oriented along a plane orthogonal to the first direction (x direction) at one end of the fixture 46. The groove 52 is positioned beneath the cartridge 16 in order to receive the arm 14 as it is lowered thereinto. The fixture 46 also has an end stop 54 parallel to the wall 53, disposed at the other end of the fixture 46 and positioned to limit movement of the end of the arm 14 in a direction oriented along the first axis (x direction).

In the present example, the arm 14 is suspended within the body of the cartridge 16 by means of a flexible rubber diaphragm 56 supported within the cartridge 16, which is attached to the end 58 of the arm 14 opposite the end holding the stylus 12, as illustrated in FIG. 2. A U-shaped clamping spring 60, shown in FIG. 1, releasably clamps the arm 14 in a retracted position in the cartridge 16. Typically, the cartridge 16 has an opening 62 in the top thereof through which a spring defeat lever (not shown) may enter the interior of the cartridge 16 and depress the clamping spring 60, thereby allowing the arm 14 to lower the stylus tip 12, which is guided by a conductive flylead spring 64 secured thereto.

The apparatus 10 also includes means for translating the array 32 along the third axis (z direction). In the present embodiment, such translating means comprises a second translation stage 66, which supports the array 32 and is driven also by the control means 50. In the present embodiment, the control means 50 receives a second output signal 68 generated by a suitably programmed computer 70 in a manner such that the first and second translational stages 48 and 66 are automatically driven. The computer 70 receives the first signal 40 generated by the processor 38 in response to the light intensity transition profile (36) (FIG. 5). The apparatus 10 also includes appropriate means for coupling the first signal 40 to the computer 70, and for connecting the second output signal 68 generated by the computer 70 to the control means 50.

A measurement to determine the shoe length (L) of the stylus tip 12 comprises two operations. First, the tip 12 must be found within the field of view of the system optics in order to center and focus the tip 12 in the manner described in the above-identified patent application Serial No. 434,316. Second, the tip 12 is scanned to obtain data required for determining the edge length 72 (L). The problem involved in making the measurements is due to the very small geometry of the lines, defined by the image of tip 12, that will tend to be blurred by light diffraction due to the relatively low numerical aperture (NA) of the objective lens 42 having a value in the range of about 0.45 to 0.5. Such low values of NA produce severe diffraction blurring.

The blurring effect is a dilemma to resolve or overcome. The effect results from the wave length ($\lambda$) of the illuminating source and the geometry of the optics. The long-working distance (LWD) objective lens 42 with a relatively low numerical apearture (NA) of 0.45 to 0.5 is needed to allow access to the body, for example, stylus tip 12, being measured. The present invention compensates for this blurring effect, as will be described, to achieve a very accurate measurement of the shoe length (L).

The imaged geometry 34 of the tip 12 is formed and identified hereinafter for the purposes of the present description by straight lines 78', 74' and 72', respectively, as shown in FIG. 4. Image 34 is derived from the electrode face 78, prow 74 and shoe edge 72, respectively. as illustrated in FIG. 3. The lines 72', 74' and 78' are the respective images of at least the portion of the edges of interest of the body of the stylus tip 12.

In carrying out the measurement process of the invention, the stylus 12 is first placed into the fixture 46 comprising the translation stage 48 carrying the fixture 46. The stylus arm 14 is placed in the groove 52 and the stylus tip 12 is positioned as shown in FIG. 2. Light source 24 provides a beam 26 passing through the optics comprising the filter 30, lens 28, long-working distance objective (LWD) lens 42 and focusing lens 44 to provide a complete or partial image 34 of the tip 12 on the Reticon photodiode array 32. A silhouette-like image 34 is thus formed on the linear array 32 oriented parallel to the x axis. After the image 34 has been focused and centered, as shown, for example, in FIG. 4, a scanning of the Reticon array 32 provides an intensity profile 36 as shown in FIG. 5.

The effect of the numerical aperture (NA) of an imaging system upon the sharpness of an imaged edge is explained in the above-identified RCA article including a plot of intensity as a function of numerical aperture (NA) variations for a wavelength of 0.7 $\mu$m. As the numerical aperture (NA) is decreased, an edge in the image plane becomes less sharp, that is, it becomes more blurred. However, as described in the above-identified RCA Engineer article, the fifty percent (50%) intensity point in the image is invariant and always corresponds to the real edge position. The real edge position can thus be accurately determined by analyzing the blurred image and determining the position of the fifty percent (50%) intensity point. If a second edge appears, the same reasoning applies as long as the blurred images of the two edges do not significantly overlap. Thus, in the present embodiment, the lines 78' and 74' are spaced sufficiently apart so that the blurred images do not overlap.

Figure 6:
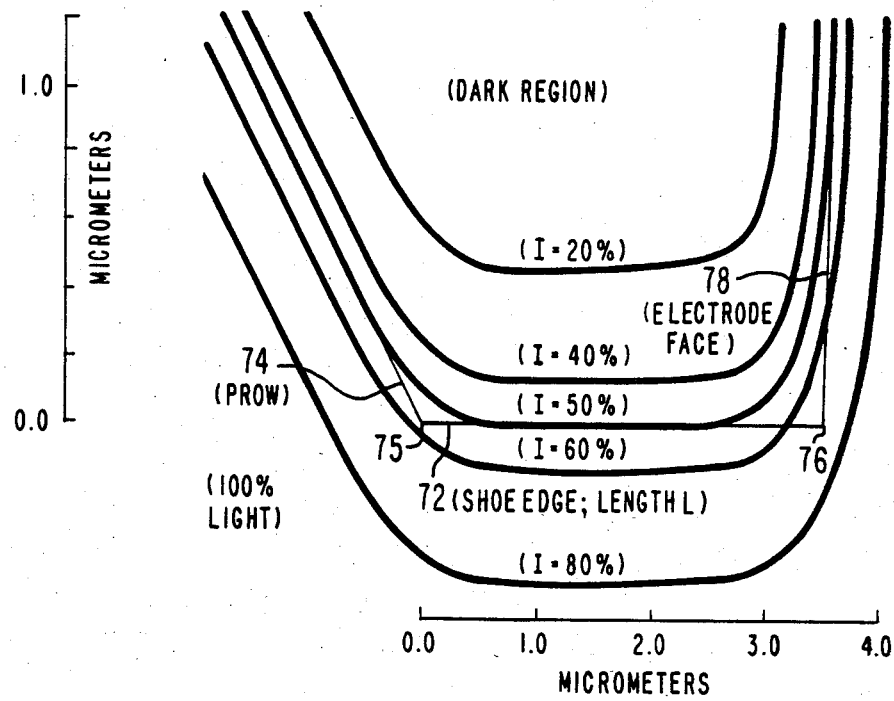
FIG. 6 is a diagram of the computed intensity level contours for an image of the stylus tip.

For an image 34 of the tip 12, a calculation has been made of the intensity contours for an image formed using an optical system having a numerical aperture (NA) of 0.45. Such computed intensity contours are shown in FIG. 6. A representative shoe length (L) of approximately 4 $\mu$m has been used in the computation. The computations show that the real and thus true (stylus) shoe edge 72 corresponds approximately to the fifty percent (50%) contour, except in the immediate vicinity of the corners 75 and 76 of the tip, such as illustrated by the actual corners 75 and 76 of tip 12 as shown in FIG. 3 and the imaged corners 75' and 76' shown in FIG. 4.

The problem that is solved by the present invention is the determination of the length (L) of the true edge 72 defined by the line between the corners 75 and 76, as shown in FIG. 6, in spite of the fact that the image 34 appearing on the array 32 is blurred.

In operation, the apparatus 10 and method of the invention provides for initially finding and then positioning the stylus 12 by the stage 48 so that the stylus edge 72 is substantially aligned along the array 32. This is done as follows: When first positioned as shown in FIG. 4, the array 32, when scanned, will generate an intensity level profile 36, as shown in FIG. 5. Next, profile 37 is generated when the imaged edge 72' is aligned with the array 32. Next, the stage 48 is moved in the y direction to focus the stylus edge 72. In this focused position, the imaged stylus edges 78' and 74', which intersect the stylus edge 72' at the corners 76' and 75', respectively, will appear in part as the image 34, shown in FIG. 4.

Figure 9:
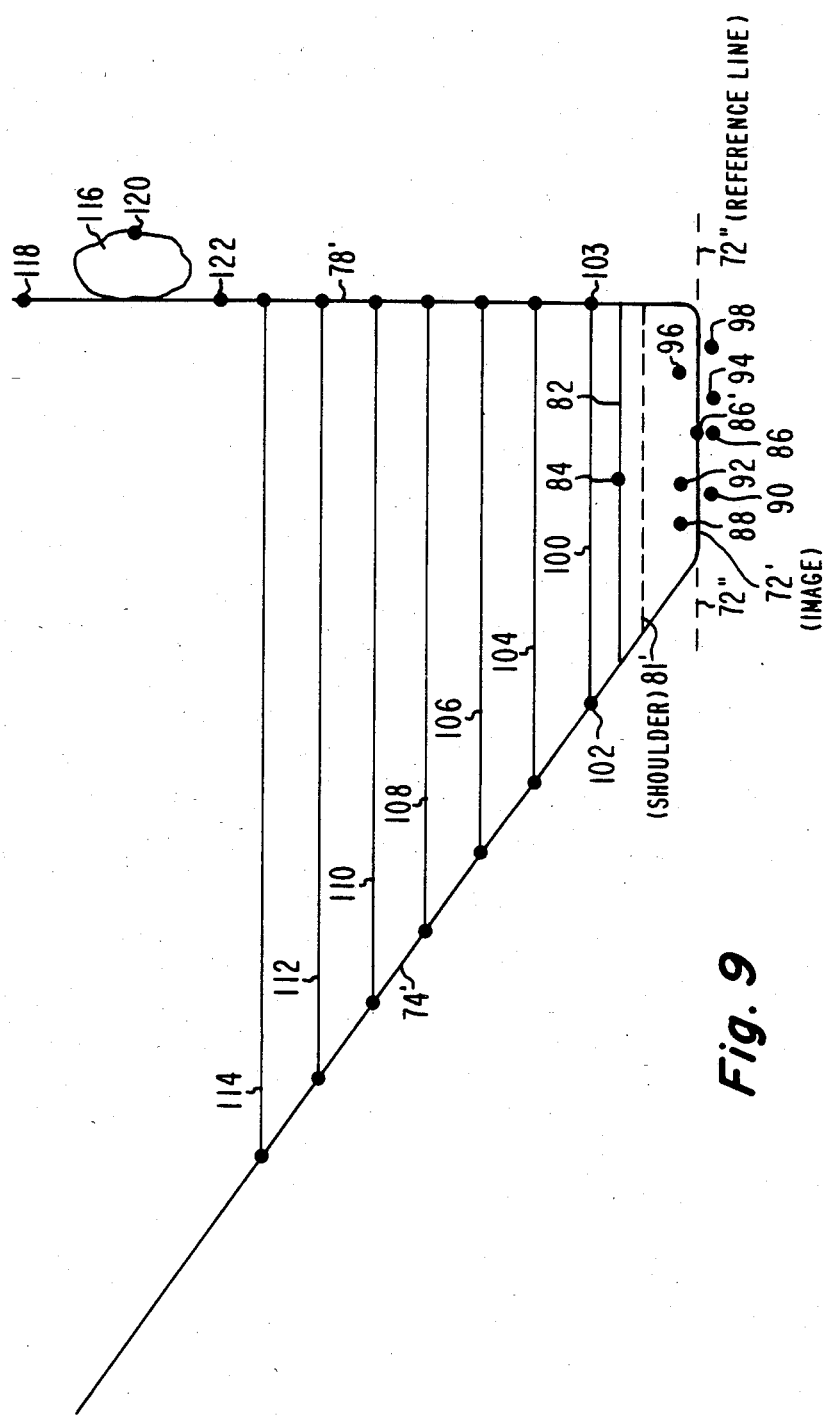
FIG. 9 is a diagram similar to FIG. 7 but showing the data points determined in the practice of one embodiment of the invention.

The next step, a tip scan, is to move the array 32 by stage 66 in the z direction which is assumed to be perpendicular to the edge 72, past the edge 72 until each of a plurality of photosensitive elements in the array 32 detect at least a fifty percent (50%) intensity profile level. It is noted that each of the elements 33 of the array 32 is being scanned simultaneously. In a preferred embodiment, the threshold of intensity is set at about sixty percent (60%) as empirically determined. It is believed that extraneous and scattered light necessitated this value. In one example, seven photodetector elements spaced from each other by at least one other element provide seven data points that are processed and analyzed by the processor 38 providing an information signal 40. Computer 70, responding to signal 40 providing information of such data points, generates data or a suitable map on display 71 used to fit a reference line 72″ to the data points, as shown in FIG. 9.

Figure 7:
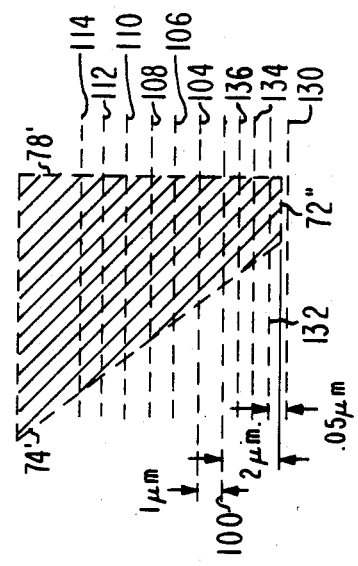
FIG. 7 is a diagram representing the image of the stylus tip illustrating the locations where two sets of image scans are made.

More specifically, the reference line 72″ is determined according to the following algorithm. The array 32 is moved to a position to define a scan line 82. The midpoint 84 of the line 82 is then determined by processor 38. In a symmetrical body, the midpoint 84 may be used to start a projection line for scanning the edge 72′ along the z axis to locate the reference line 72″. However, because of the asymmetry of the stylus 12, a reference point 86, located along a diagonal from point 84, is used for the tip scan. The z direction tip scan is achieved by scanning past at least a portion of the edge 72′ by stepping the array 32 in small increments to provide an effective movement of about 0.05 $\mu$m, as shown in FIG. 7. The scan can be started from below or above the edge 72′.

Because of the magnification (200×) of the lens 42 and lens 44, a relatively large incremental movement of array 32 in the image plane is needed to achieve the desired small incremental scan of the stylus in the object plane. Thus for an effective image scan increment of 0.05 $\mu$m, the array 32 is moved 10 $\mu$m (200×0.05 $\mu$m). This movement is applicable to all the scans explained herein. It will be understood that this magnification effect on the relative movement of the stylus and array applied to the scans hereinafter described.

Figure 8:
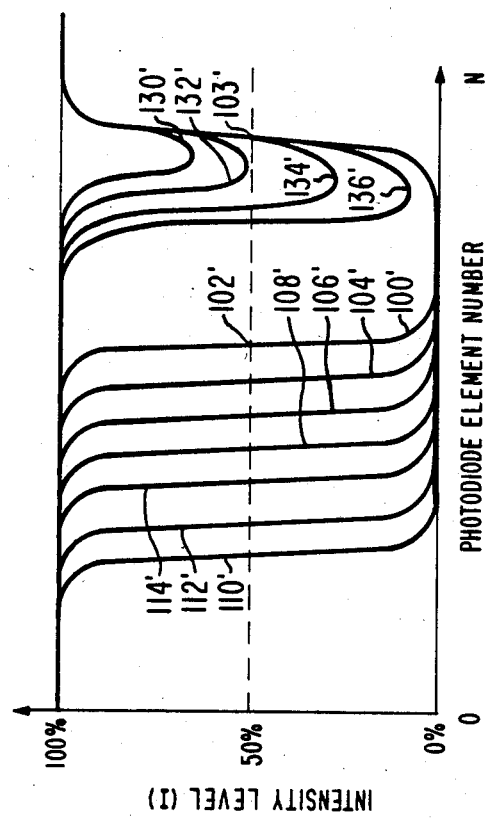
FIG. 8 is a diagram of the light intensity profiles along the photodetector array corresponding to the two sets of image scans illustrated in FIG. 7.

Assuming the tip scan is started below the edge 72′, the first scan 130 will provide an intensity profile 130′, as shown in FIG. 8. Moving the array 32 to scan line 132 will cause a profille 132′. Coincidentally, but not necessarily, scan line 132 is colinear with the reference line 72″. Similarly, scan lines 134 and 136 provide profiles 134′ and 136′. The selected elements 33 of photodiode array 32 provide after each scan position data of individual intensity levels which are stored in the processor 38. At the completion of the intensity profile scans 130 . . . 136, the processor 38 provides information to the computer 70 for calculating the location of points representing a predetermined value of intensity levels. Points 86, 88, 90, 92, 94, 96 and 98, shown in FIG. 9, correspond in location to the seven spaced photodetectors 33 in the array 32 that were preselected to sense the intensity level measurements during the scan for the reference edge line 72″. The line 72″ is determined by a fit to the points 86 . . . 98 by computer 70. After the line 72″ has been fitted to the points 86 . . . 98, the value of the average, the median, or the fitted line value at that point of the intensity levels, as desired, is assigned to the midpoint 86 of the group of seven data points, namely point 86 is repositioned with a value 86′. The line 72″ is then repositioned to pass through that location (86′) in an assumed direction parallel to the x axis. This assumed direction compensates for any skewing of the stylus edge 72 from the horizontal x axis. Many experiments have shown this to be a valid and accurate assumption.

The reference line 72″ is used as the starting line for the second phase of the measurements, i.e., the body scan. To do this, the array 32 is moved in the appropriate z direction to be positioned to align at least a portion of the image line 72′ with the reference line 72″. The array 32 is then moved at a fixed predetermined interval, for example, of 2 $\mu$m above the edge 72′, as indicated by scan line 100 in FIGS. 7 and 9. An intensity profile 100′ is then generated as shown in FIG. 8. The data points are evaluated by computer 70 determine the location on the array 32 of the fifty percent (50%) intensity levels which correspond to points 102 and 103, respectively, on prow image edge 74′ and electrode image edge 78′. Line points 102 and 103 are shown in FIG. 8 along profile 100′ as points 102′ and 103′. Six additional scans in stepped sequences of 1 $\mu$m each are made as indicated by scan lines 104, 106, 108, 110, 112 and 114 providing profiles 104′ . . . 114′, and corresponding to the location of the fifty percent (50%) intensity level points.

The data of each of the line intensity level points 102′, 103′, etc., are processed by the processor 38 and computer 70 to provide a line fit to determine the other body edge lines 74′ and 78′. The lines, after such a determination, are then extended to the reference line 72″. The respective intersections of the lines 74′ and 78′, with the reference line 72′, define the edge line 72 and thus the true length (L) of the edge 72 of the stylus tip 12. The computer 70 is programmed to determine the true length 72 of the stylus tip 12 by a geometric solution of the lines 74′, 78′ and 72″ intersecting as shown in FIG. 9. Thus by the procedure just described, an image that is blurred particularly at the corners of the actual edge line 72, as shown in FIG. 6, can be compensated for to determine the true length of that edge 72.

In practice, dust particles, such as particle 116 shown in FIG. 9, may be attached to one surface or edge of the stylus tip 12 being measured. The location of particle 116 is shown for convenience. In practice, the particle 116 will be troublesome only if located along the lower edge portions below scan line 114, for example. Such particles may range in sizes of 1-2 $\mu$m. If, for example, a series of data points 118, 120 and 122 were generated on the photodetector array 32 when scan lines were made in the vicinity of particle 116, it can be seen that an erroneous set of data will be generated. Such erroneous data could cause the fit line 78′ to be displaced towards the dust particle 116. In order to obviate or negate the effect of such erroneous data, the computer 70 is programmeed to iterate the data points several times to reject large deviations from a straight line fitted to the intensity level data values. By such iteration, the erroneous data point 120 corresponding to dust particle 116 will be rejected and the fitted edge line 78′ will be more nearly accurate.

It should be appreciated, as mentioned above, that by moving the array 32 in the vertical direction along the z axis on the order of 1 $\mu$m steps, a significant improvement in resolution is achieved even with the optical arrangement illustrated in FIGS. 1 and 2. A typical magnification achieved by the optical arrangement is on the order of 100× to 200×. The cartridge 16 assembly shown in FIG. 1 is arranged such that the microscope objective of lens 42, with a working distance greater than 5 millimeters, is required. Suitable long-working distance objectives are commercially available with a numerical aperture (NA) of about 0.45, as explained above. An eyepiece 44 has a magnification of about 10× which further magnifies the image. A suitable choice of component separations provides a 100× to 200× non-inverted stylus tip image 34 at the plane of the array 32. With a 150× magnification, the 15 μm sampling size is equivalent to 0.1 μm in the stylus plane. A translation in 1 μm steps on the array 32 by the translation stage 66 provides thus a very significant good resolution.

In the present embodiment, the movements of the translation stage 48 carrying the fixture 46 for the cartridge 16 and the translating stage 66 carrying the array 32 are achieved by stepping motors that are controlled by the control means 50. The computer 70 is appropriately programmed to achieve the various steps of the measurement described hereinabove.

The present invention provides an optical measurement technique providing high accuracy even with imaging optics having relatively low numerical apertures (NA) of about 0.45 and large working distances in excess of 10 millimeters. A precision of better than ±0.2 μm has been demonstrated using the method of the present invention. This accuracy should be compared to the classical Rayleigh resolution criterion of about 0.8 μm. The long working distance optical arrangement of the present invention enables the measurement to be carried out on objects with restricted physical access realizing the high level of precision which would otherwise be unattainable.

Moreover, this technique of measuring "blurred" images is applicable to many types of high resolution measurement problems. While it was described in terms of optically opaque objects with straight lines for boundaries, with suitable changes in the algorithms controlling the computer 70, curved edges or boundaries can also be determined to this degree of accuracy provided the shape of the body is known beforehand.

While the invention has been described in terms of determining the true length of an edge 72 of a stylus tip 12, it will be apparent to those skilled in this art that by a suitable modification of the algorithm lengths of curved edges of bodies with curved surfaces may be determined in the practice of the invention. Many more scan lines, however, would be needed to make such determinations.

What is claimed is:

1. A method of determining the true edge length of a body subtended by two other body edges, comprising:
   (a) exposing the body to a beam of light such that the edge is imaged by an optical system for projecting a linear section across said body as a focused silhouette-like image onto an array of photosensitive elements;
   (b) moving said array to scan at least a portion of said edge to provide a data point of a predetermined minimum intensity level sensed by each of a respective plurality of said elements;
   (c) determining a first line from said data points representing the location of said true edge;
   (d) moving said array to scan said other body edges to provide a second and third plurality of data points of a predetermined intensity level;
   (e) determining a second line and third line, respectively, from said second and third plurality of data points representing at least a portion of said other body edges; and
   (f) extending said second and third lines to intersect said first line, the distance between said intersection points representing the true length of said body edge.

2. A method for determining the true length of one edge of a body using an optical apparatus having a condenser lens for providing a beam of light from a source to illuminate said body, a long-working distance (LWD) objective lens to form an image of the illuminated body, and an eyepiece lens for focusing the image of said body on an imaging plane, all of said lenses being spaced from said body sufficiently to allow free movement thereof, said body having at least two other edges each respectively intersecting said one edge, all of said edges when illuminated causing diffraction effects which may blur an image of at least said one edge, comprising the steps of:
   (a) positioning said body to a first body position relative to said beam of light to project a focused silhouette-like image of at least a portion of said one edge of said body along a linear array of photosensitive elements initially positioned in said imaging plane at about the fifty percent (50%) intensity profile of said image as provided by electrically scanning said array, and to provide an image on said array of at least a portion of each of said other edges respectively intersecting said one edge;
   (b) moving said array in one direction substantially perpendicular to and past said one edge to scan said one edge until each of a preselected plurality of said photosensitive elements detect at least a fifty percent (50%) intensity profile level;
   (c) fitting a line through the respective values of the last detected intensity levels of each element, said line representing the reference location of said one edge;
   (d) moving said array in one direction from said reference location to a plurality of locations relative to said body image in predetermined stepped distances;
   (e) scanning said array at each respective location of said plurality of locations to generate a light intensity profile of said image to provide thereby a set of fifty percent (50%) intensity points each point corresponding to a respective point on each of said other edges;
   (f) fitting a line through each set of points; and
   (g) extending said fitted lines to intersect a line coextensive with said reference line, the distance between the respective intersections on said coextensive line being the true length of said one edge.

3. The method of claim 2 wherein said body comprises a tip of a stylus mounted on an arm positioned by a fixture supported on a first translational stage, and wherein said moving steps are performed by driving said first translational stage in directions to position said tip centrally relative to said array.

4. The method of claim 3 wherein said arm is flexibly attached to a cartridge seated on a base plate disposed adjacent said fixture, said fixture having a V-shaped groove positioned to guide said arm in directions oriented along a second axis and a third axis, and also having an end stop positioned to limit the movement of the end of said arm in a direction oriented along a first axis, and wherein said positioning step is performed by lowering said arm into said V-groove and allowing the end of said arm to press against said end stop, whereas said tip is exposed to said light beam.

5. The method of claim 4 wherein said tip includes a prow terminating at a base thereof and a stem remote from said prow, said tip adapted to track a path along a surface of an information record and to measure capacitive variations between said stylus and the surface of said record when relative motion is established between said stylus and said record, and wherein said one edge length being determined is the shoe length of said stylus comprising the distance between said base and said stem along a line tangent to said path at the tracking location.

6. The method of claim 2 wherein said array moving step is performed by moving said second translational stage at preselected intervals of about 1 to 2 micrometers (μm), and wherein said changing step is performed by changing the position of said second translational stage in 200 micrometer (μm) steps.

7. The method of claim 6 wherein said scanning step is performed by a processor connected to said array, and wherein said recording, said fitting, said determining and said measuring steps are performed by a computer coupled to said processor and adapted to receive a signal generated by said processor.

8. The method of claim 7 wherein said method further comprises a step of transmitting a second signal, generated by said computer, to control means for driving said first and second translational stages in a manner such that said shifting, said moving, said translating and said changing steps are automatically performed.

9. The method of claim 2 wherein said beam exposing step comprises a providing an optical system for forming said beam including a long-working distance objective lense having a numerical aperture (NA) of about 0.45 and power within the range of about 20× to 50×.

10. An apparatus for determining the true edge length of a body subtended by two other body edges, comprising:
   (a) means for exposing the body to a beam of light such that the edge is imaged by an optical system for projecting a linear section across said body as a focused silhouette-like image onto an array of photosensitive elements;
   (b) means for moving said array to scan at least a portion of said edge to provide a data point of a predetermined minimum intensity level sensed by each of a respective plurality of said elements;
   (c) means for determining a first line from said data points representing the location of said true edge;
   (d) means for moving said array to scan said other body edges to provide a second and third plurality of data points of a predetermined intensity level;
   (e) means for determining a second line and third line, respectively, from said second and third pluralities of data points representing at least a portion of said other body edges; and
   (f) means for extending said second and third lines to intersect said first line, the distance between said intersection points representing the true length of said body edge.

11. An optical apparatus for determining the true length of one edge of a body, said apparatus having a condenser lens for providing a beam of light from a source to illuminate said body, a long-working distance (LWD) objective lens to form an image of the illuminated body, and an eyepiece lens for focusing the image of said body on an imaging plane, all of said lenses being spaced from said body sufficiently to allow free movement thereof, said body having at least two other edges each respectively intersecting said one edge, all of said edges when illuminated causing diffraction effects which may blur an image of at least said one edge, comprising:
   (a) means for positioning said body to a first body position relative to said beam of light to project a focused silhouette-like image of at least a portion of said one edge of said body along a linear array of photosensitive elements initially positioned in said imaging plane at about the fifty percent (50%) intensity profile of said image as provided by electrically scanning said array, and to provide an image on said array of at least a portion of each of said other edges respectively intersecting said one edge;
   (b) means for moving said array in one direction substantially perpendicular to and past said one edge to scan said one edge until each of a preselected plurality of said photosensitive elements detect at least a fifty percent (50%) intensity profile level;
   (c) means for fitting a line through the respective values of the last detected intensity levels of each element, said line representing the reference location of said one edge;
   (d) means for moving said array in one direction from said reference location to a plurality of locations relative to said body image in predetermined stepped distances;
   (e) means for scanning said array at each respective location of said plurality of locations to generate a light intensity profile of said image to provide thereby a set of fifty percent (50%) intensity points each point corresponding to a respective point on each of said other edges;
   (f) means for fitting a line through each set of points; and
   (g) means for extending said fitted lines to intersect a line coextensive with said reference line, the distance between the respective intersections on said coextensive line being the true length of said one edge.

12. The apparatus of claim 11 wherein said body comprises a tip of a stylus mounted on an arm positioned by a fixture supported on a first translational stage, and wherein said moving means includes driving said first translational stage in directions to position said tip centrally relative to said array.

13. The apparatus of claim 12 wherein said arm is flexibly attached to a cartridge seated on a base plate disposed adjacent said fixture, said fixture having a V-shaped groove positioned to guide said arm in directions oriented along a second axis and a third axis, and also having an end stop positioned to limit the movement of the end of said arm in a direction oriented along a first axis, and wherein said positioning means includes lowering said arm into said V-groove and allowing the end of said arm to press against said end stop, whereas said tip is exposed to said light beam.

14. The apparatus of claim 13 wherein said tip includes a prow terminating at a base thereof and a stem remote from said prow, said tip adapted to track a path along a surface of an information record and to measure capacitive variations between said stylus and the surface of said record when relative motion is established between said stylus and said record, and wherein said one edge length being determined is the shoe length of said stylus comprising the distance between said base and said stem along a line tangent to said path at the tracking location.

15. The apparatus of claim 11 wherein array moving means comprises means for moving said second translational stage at preselected intervals of about 1 to 2 micrometers (μm), and wherein said scanning means comprises changing the position of said second translational stage in 200 micrometer (μm) steps.

16. The apparatus of claim 15 wherein said scanning means includes a processor connected to said array, and wherein said recording, said fitting, said determining and said measuring means further include a computer coupled to said processor and adapted to receive a signal generated by said processor.

17. The apparatus of claim 16 further comprising means for transmitting a second signal, generated by said computer, to control means for driving said first and second translational stages in a manner such that said shifting, said moving, said translating and said changing means are automatically performed.

18. The apparatus of claim 11 wherein said beam exposing positioning means comprises an optical system for forming said beam including a long-working distance objective lens having a numerical aperture (NA) of about 0.45 and power within the range of about 20× to 50×.

19. The method according to claim 1 wherein said second and third set of data points are iterated to identify and discard data points that deviate by a predetermined value indicative of a foreign particle on either of said other body edges.

* * * * *